United States Patent
Behzadpour et al.

(10) Patent No.: US 11,584,502 B2
(45) Date of Patent: Feb. 21, 2023

(54) COMPOSITE FABRIC HAT STRINGERS HAVING INTERLEAFED TAPE PLIES

(71) Applicant: The Boeing Company, Chicago, IL (US)

(72) Inventors: Forouzan Behzadpour, Woodinville, WA (US); Patrick Bickford Stickler, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/443,026

(22) Filed: Jul. 20, 2021

(65) Prior Publication Data

US 2022/0033049 A1    Feb. 3, 2022

Related U.S. Application Data

(60) Provisional application No. 63/058,074, filed on Jul. 29, 2020.

(51) Int. Cl.
| | |
|---|---|
| *B64C 1/06* | (2006.01) |
| *B32B 3/28* | (2006.01) |
| *B32B 3/26* | (2006.01) |
| *B29C 70/30* | (2006.01) |
| *B29C 70/20* | (2006.01) |

(52) U.S. Cl.
CPC ............ *B64C 1/064* (2013.01); *B29C 70/202* (2013.01); *B29C 70/302* (2021.05); *B32B 3/263* (2013.01); *B32B 3/28* (2013.01); *B32B 2605/18* (2013.01)

(58) Field of Classification Search
CPC ..... B64C 1/064; B29C 70/302; B29C 70/202; B32B 3/263; B32B 3/28; B32B 2605/18
See application file for complete search history.

(56) References Cited

U.S. PATENT DOCUMENTS

| | | | |
|---|---|---|---|
| 10,449,754 B2 | 10/2019 | Blom-Schieber | |
| 2009/0176066 A1* | 7/2009 | Darrow ................ | B29C 70/085 156/60 |
| 2018/0072399 A1 | 3/2018 | Walker et al. | |
| 2019/0016436 A1 | 1/2019 | Stickler et al. | |

* cited by examiner

*Primary Examiner* — Catherine A. Simone
(74) *Attorney, Agent, or Firm* — Yee & Associates, P.C.

(57) ABSTRACT

A composite hat stringer for stiffening a panel includes a plurality of composite fabric plies arranged to form a cap, a pair of flanges and a pair of webs respectively connecting the cap with the pair of flanges. The cap includes at least one 0° composite tape ply interleafed in the composite fabric plies within the cap.

20 Claims, 9 Drawing Sheets

| STRINGER TYPE | FABRIC PLIES (0/90)/(+/-45) | HAT 0 DEGREE CAP TAPE PLIES | 0 DEGREE BASECHARGE PLIES |
|---|---|---|---|
| LIGHT | 6-12 | 2-4 | 2-6 |
| MEDIUM | 12-24 | 4-6 | 4-8 |
| HEAVY GAUGE | >24 | >6 | >8 |

COMPOSITE FABRIC HAT STRINGERS HAVING INTERLEAFED TAPE PLIES

BACKGROUND INFORMATION

1. Field

The present disclosure generally relates to the fabrication of composite stiffeners, and deals more particularly with a composite fabric stringer having interleaved tape plies, and a method of making such stringers.

2. Background

Composite stringers are typically fabricated from unidirectional prepreg tape. The tape layup for making the stringers is highly directional, typically comprising about 50% 0° plies and 10% 90° plies. This imbalance between 0° and 90° plies results in undesired interlaminar residual stresses. Composite stringers formed from unidirectional prepreg tape are prone to warpage and wrinkling when they are formed as a flat charge to a desired cross-sectional stringer shape for several reasons, including the interlaminar stresses mentioned above, the shape of the stringer, changes in geometry of the stringer along its length and the inherent behavior of tapes which make them difficult to form. Ply wrinkling/warpage is undesirable because it may reduce stringer performance, including loadbearing capacity.

A number of techniques have been used to mitigate ply wrinkling/warpage, but none have been entirely effective. For example, the 0° tape plies may be periodically cut along their length and butt spliced together. In some cases, certain features of the stringer can be constrained during forming to reduce wrinkling. In other cases, the stringers may be overdesigned by adding additional plies to compensate for the reduced performance caused by wrinkling, but this approach results in additional material costs and adds undesired weight to the Stringer. Stringers may also be reworked to reduce wrinkling, but this solution is time-consuming and labor-intensive.

Accordingly, it would be desirable to provide a composite laminate stringer having the desired strength characteristics which can be easily formed to a desired cross sectional shape without wrinkling and/or warpage. It would also be desirable to provide a method of making hat stringers using composite fabric charges.

SUMMARY

The disclosure relates in general to composite stiffeners such as stringers, and more specifically to a hat shaped composite laminate stringer that is substantially free of wrinkling and/or warpage.

According to one aspect, a composite hat stringer is provided for stiffening a panel. The composite hat stringer comprises a plurality of composite fabric plies arranged to form a cap, a pair of flanges and a pair of webs respectively connecting the cap with the pair of flanges. The composite hat stringer further includes at least one composite tape ply within the cap.

According to another aspect, a stiffened composite panel assembly comprises a composite panel formed of multiple plies of composite tape. The composite panel includes a base charge extending in a spanwise direction of the composite panel. The stiffened composite panel assembly further includes a composite hat stringer joined to the base charge and extending in the spanwise direction of the composite panel. The composite hat stringer is formed of laminated plies of composite fabric and includes least one composite tape ply.

According to still another aspect, a method is provided of making a composite hat stringer. The method comprises assembling a composite charge, including laying up a stack of composite fabric plies and interleafing at least one composite tape ply within the stack of composite fabric plies. The method further includes forming the composite charge into a hat shaped cross section having a cap, wherein the composite tape ply is located within the cap.

One of the advantages of the disclosed composite fabric hat stringer is that it may be formed from a flat multi-ply composite fabric charge to a desired cross-sectional shape with reduced ply wrinkling. Another advantage is that the number of plies required to make a stringer meeting desired performance standards may be reduced, thereby reducing stringer weight. Another advantage is that the design of composite stringers can be more closely tailored to desired performance requirements. Still another advantage is that the layup charge used to fabricate the stringers is not subject to the normal ply stacking sequence guidelines. Another advantage is that charge layups with excess load carrying capacity can be avoided. A further advantage is that the disclosed hat stringers can be produced using existing tooling and fabrication processes.

The features, functions, and advantages can be achieved independently in various examples of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
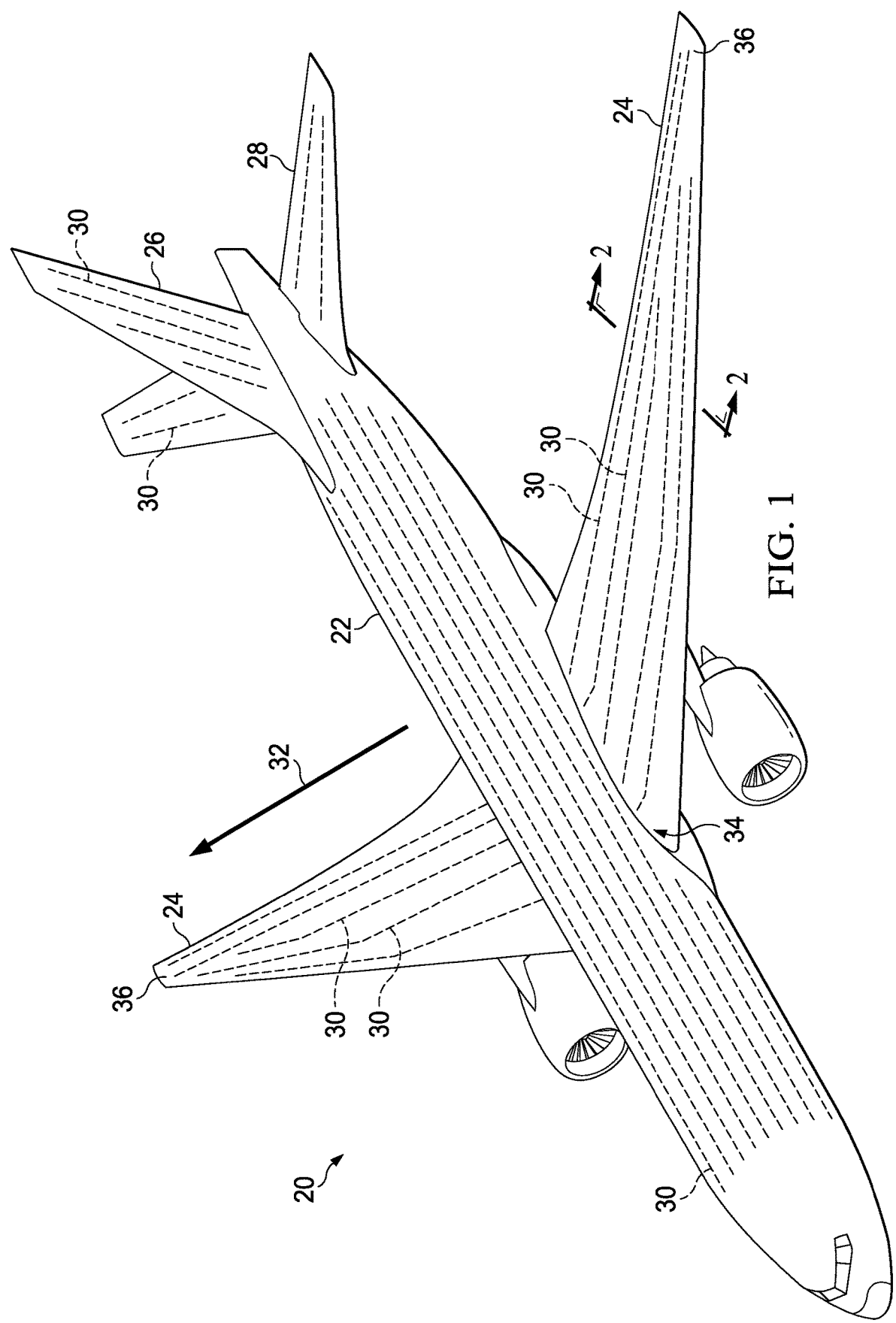
FIG. 1 is an illustration of a perspective view of an airplane, the locations of stringers indicated in broken lines.
Figure 2:
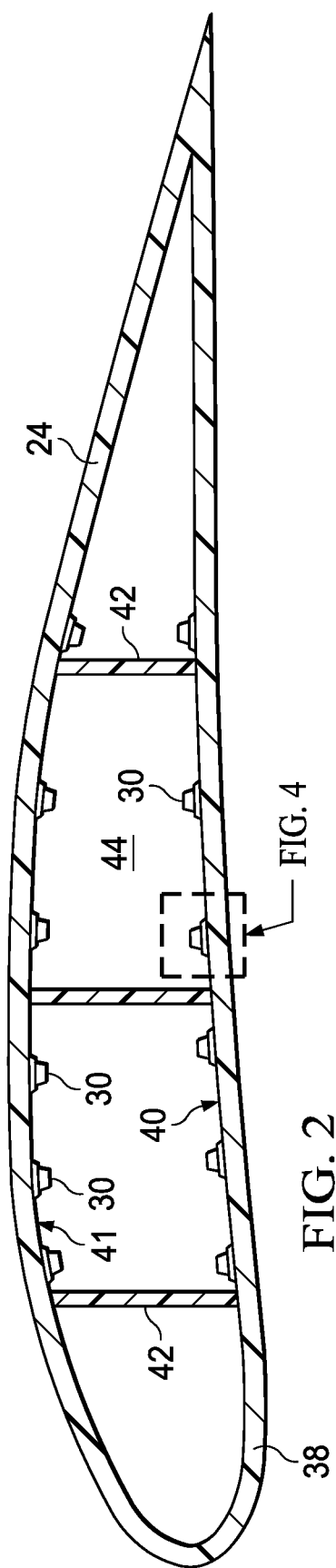
FIG. 2 is an illustration of a sectional view taken along the line 2-2 in FIG. 1.
Figure 3:
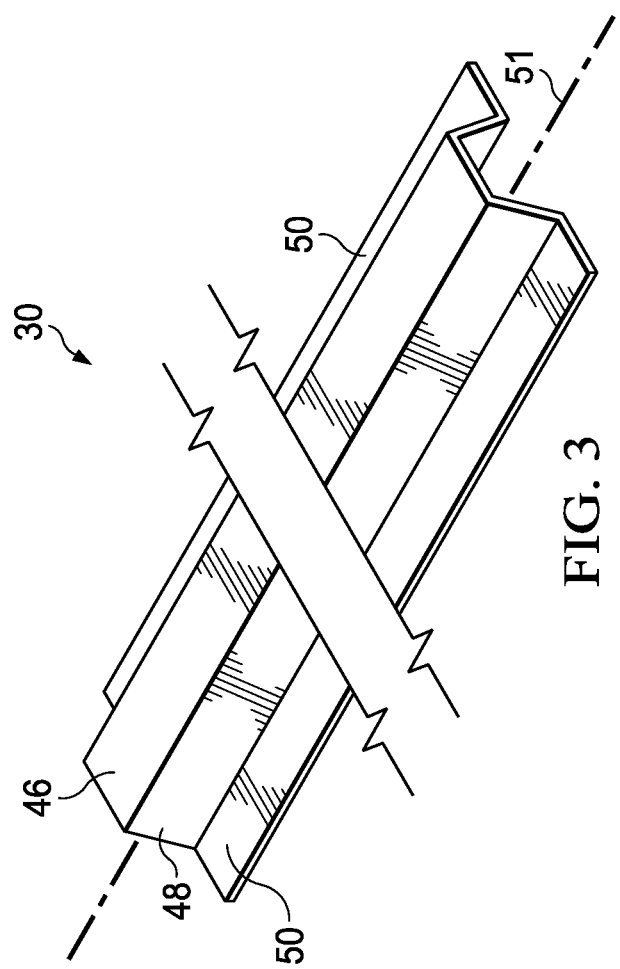
FIG. 3 is an illustration of a perspective view of one of the stringers shown in FIGS. 1 and 2.

Referring first to FIGS. 1-3, an airplane 20 comprises a fuselage 22, wings 24, a vertical stabilizer 26 and horizontal stabilizers 28, all of which have skins 38 stiffened by hat stringers 30. For example, each of the wings 24 includes a wing box 41 (FIG. 2) formed by spars 42 and ribs 44 that are covered by a skin 38. The skin 38 may be a composite laminate formed of a composite tape, such as carbon fiber reinforced plastic having unidirectional reinforcing fibers, that is laid up with differing fiber orientations, for example, 0°, +/−45°, 90°. The skin 38 is reinforced by hat stringers 30 which extend in a spanwise direction 32 from the side-of-body 34 to the wing tips 36. Each of the hat stringers 30 comprises a composite laminate that is joined to the IML (inner mold line) 40 of the skin 38, typically by co-curing or by co-bonding.

Figure 4:
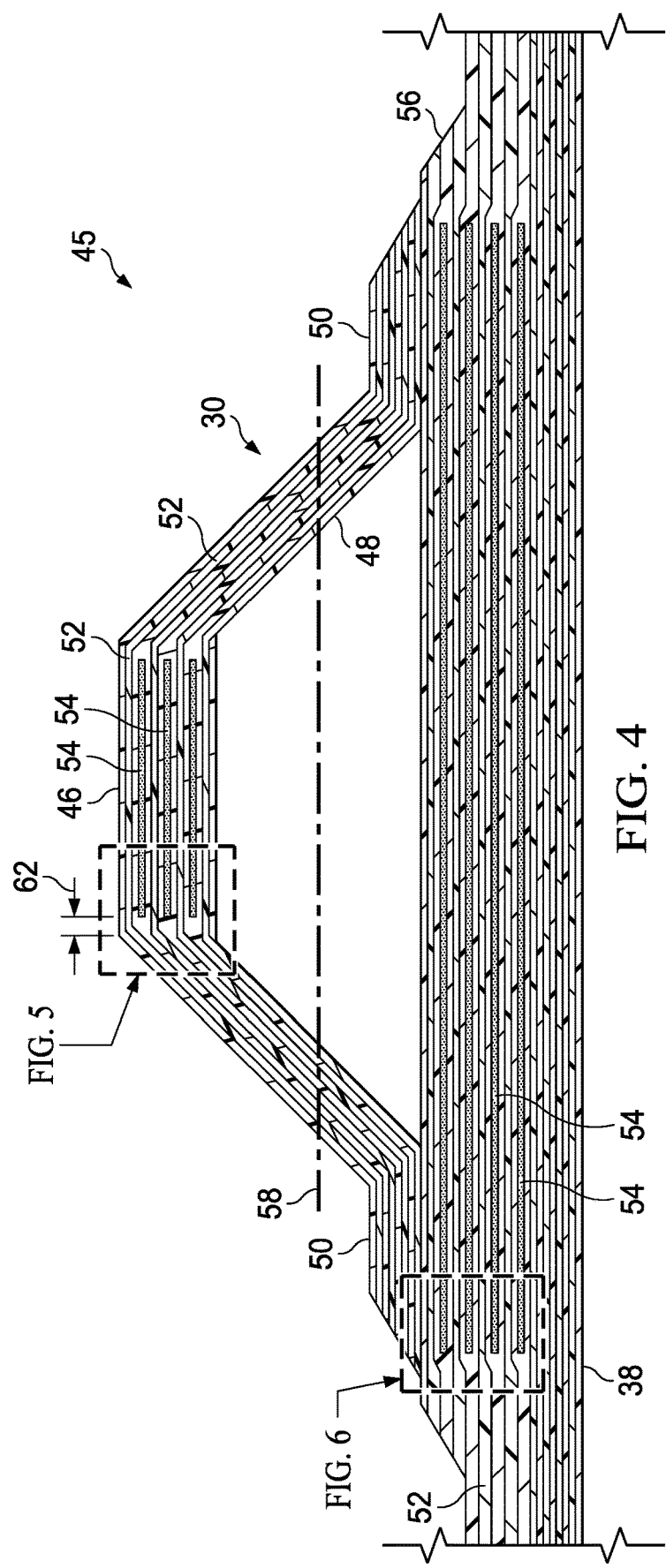
FIG. 4 is an illustration of a view of the area designated as FIG. 4 in FIG. 2.
Figure 6:
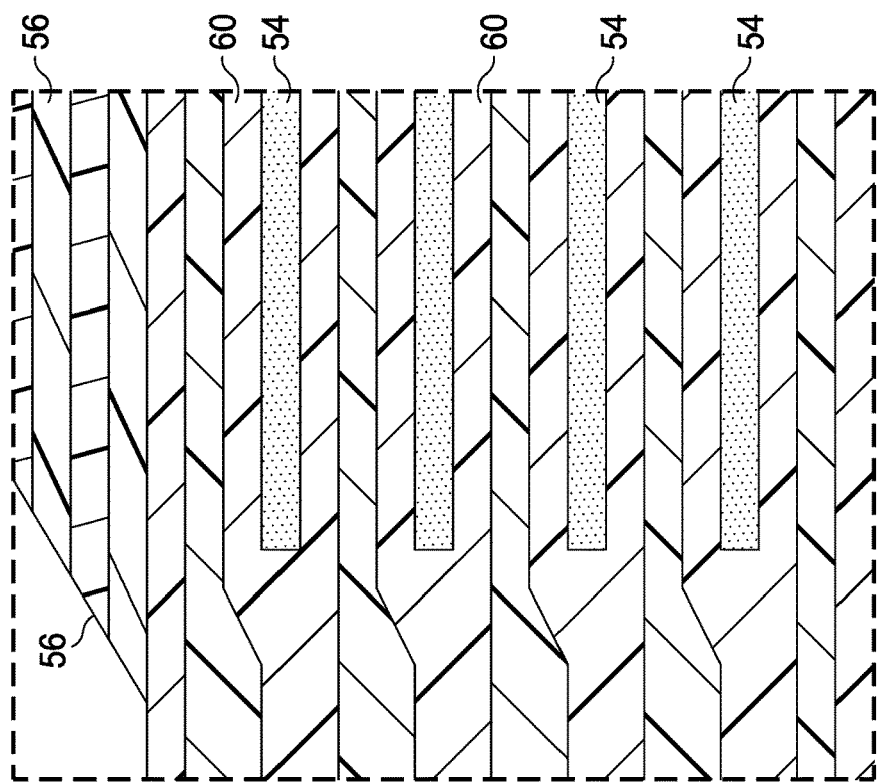
FIG. 6 is an illustration of the area designated is FIG. 6 in FIG. 4.
Figure 5:
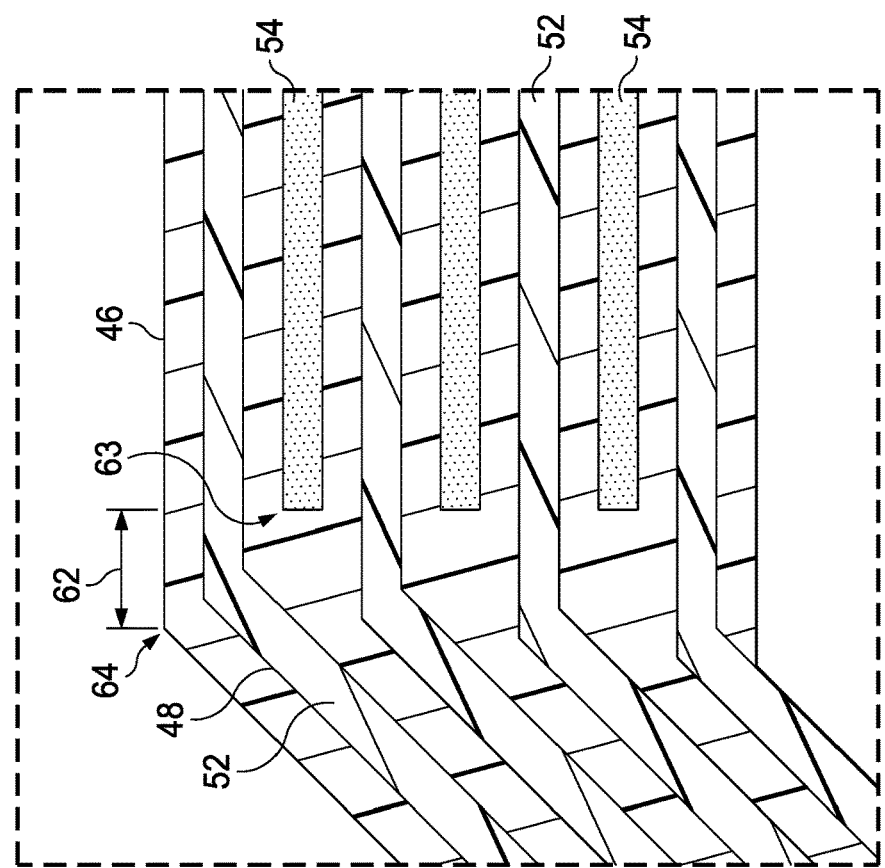
FIG. 5 is an illustration of the area designated as FIG. 5 in FIG. 4.

Attention is now directed to FIGS. 4-6, which illustrate additional details of a stiffened composite panel assembly 45, which in this example, is in the form of composite skin 38 stiffened by the hat stringers 30 shown in FIGS. 1-3. It should be noted here that in the disclosed examples, the hat stringers 30 are employed to stiffen and transfer loads on skins 38 of an airplane 20, or other aircraft, however, they may be used to reinforce skins and other panels used in a variety of other applications. The hat stringer 30 comprises a cap 46 connected to a pair of flanges 50 by a pair of webs 48. The hat stringer 30 is a composite laminate, formed from a charge of fabric plies 52, each of which comprises a composite woven or knitted fabric. Each of the fabric plies 52 may include fiber tows (not shown) interwoven with differing fiber orientations, such as 0°, 45+/−45° and 90°. Although not shown in the Figures, the hat stringer 30 may have a varying thickness, contours or joggles along its length, depending on the application.

The cap 46 of the hat stringer 30 includes at least one composite tape ply 54 having a 0° fiber orientation aligned with the longitudinal axis of the hat stringer 30, which in this example, corresponds to the spanwise direction 32 of the wings 24. In examples where the cap 46 includes more than one composite tape ply 54, such as that shown in FIGS. 4-6, adjacent ones of the composite tape plies 54 are separated by at least one of the fabric plies 52. The composite tape plies 54 are interleafed with the fabric plies 52 in any desired order that is suitable for the application to achieve desired performance characteristics, including torsional stiffness and bending stiffness in the spanwise direction 32. The composite tape plies 54 are preferably located above, but as close as possible to the neutral axis of the hat stringer 30, which in this example is the midplane 58 of the hat stringer 30. The outer edges 63 of the composite tape plies 54 may be offset a desired distance 62 from the outer edges 64 of the cap 46 during layup to assure that the composite tape plies 54 do not extend over the outer edges 64 into the region of the webs 48 as a result of layup process variations.

The use of the fabric plies 52 provides the hat stringer 30 with the desired torsional stiffness while facilitating shear and formability, resulting in reduced wrinkling and/or warpage. The bending strength provided by the interleafed composite tape plies 54 compensates for the lower stiffness of the fabric plies 52 in the spanwise direction 32. Thus, the hat stringer 30 comprises a hybrid laminate that avoids the need for a stringer design that is balanced and symmetric. Moreover, the use of a hybrid laminate allows tailoring specific stringer bending and torsional stiffnesses such that excess stiffness which adds weight to the hat stringer 30, is avoided. A balanced mixture of fabric plies 52 and composite tape plies 54 results in a hat stringer 30 that is highly efficient in resisting bending and torsional loads while minimizing stringer weight.

In the example shown in FIGS. 4-6, the skin 38 is provided with a base charge 56 beneath the hat stringer 30 in order to provide the skin 38 with additional stiffness. The base charge 56, sometimes referred to as a plank region of the skin 38, comprises multidirectional composite tape plies 60 having varying fiber orientations. In the illustrated example, composite tape plies 54 having 0° fiber orientations are interleafed within the base charge 56, as well as within the skin 38 near the IML 40. Strategic placement of the composite tape plies 54 in the cap 46 can be coordinated with the number and placement of the composite tape 0° plies 54 in the base charge to optimize transfer of loads from the skin 38 to the hat stringer 30.

Figures 7, 8:
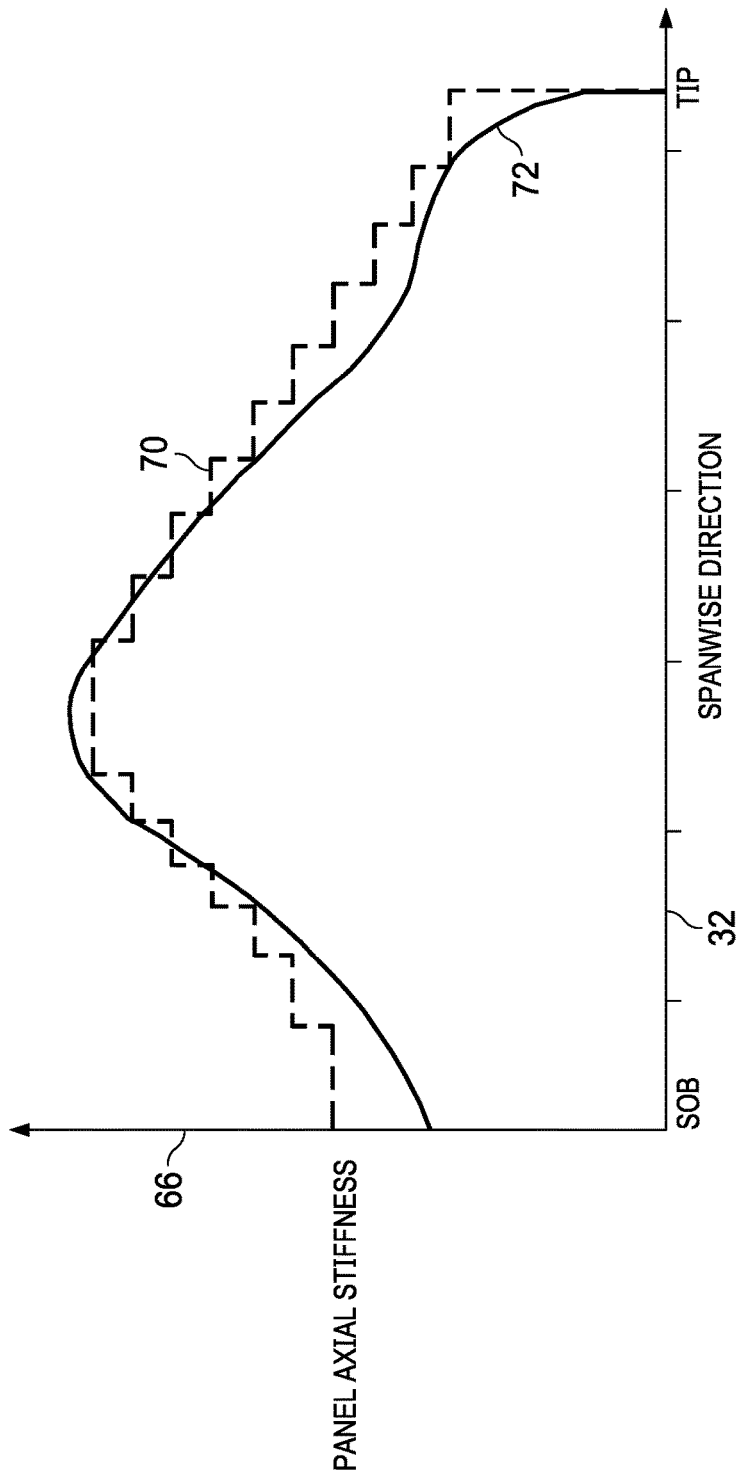
FIG. 7 is an illustration of a graph showing how panel stiffness can be tailored along the length of a wing using the disclosed hat stringers.
FIG. 8 is an illustration of a chart showing combinations of fabric plies and tape plies for light, medium and heavy gauge hat stringers.

FIG. 7 is a graph of the wing skin panel axial stiffness 66 in the spanwise direction 32, extending from the side-of-body (SOB) 34 to the wing tip 36, of an example embodiment of a wing panel constructed in accordance with aspects of this disclosure. The curve 72 represents the required axial stiffness of the wing panel, while a broken line 70 represents the actual axial stiffness of the wing panel. From this graph, it may be appreciated that by using hat stringers 30 having a balanced mixture of fabric plies 52 and interleafed composite tape plies 54, the actual panel stiffness can be tailored to closely match the required axial stiffness.

The number of fabric plies 52 and composite tape plies 54 used in the hat stringer 30 will vary with the application. In connection aircraft such of the airplane 20 shown in FIG. 1, hat stringers 30 with various load carrying abilities may be used in different parts of the airplane 20. For example, FIG. 8 is a chart showing the approximate number fabric plies 52 and composite tape 0° plies that may be used in light, medium and heavy gauge stringers and base charges that may be used in an aircraft such as airplane 20. Although not shown in the drawings, strategic ply drop-offs of both the fabric plies 52 and the composite tape plies 54 may be used along the length of the wings 24 in order to tailor wing stiffness in the spanwise direction 32.

Figure 9:
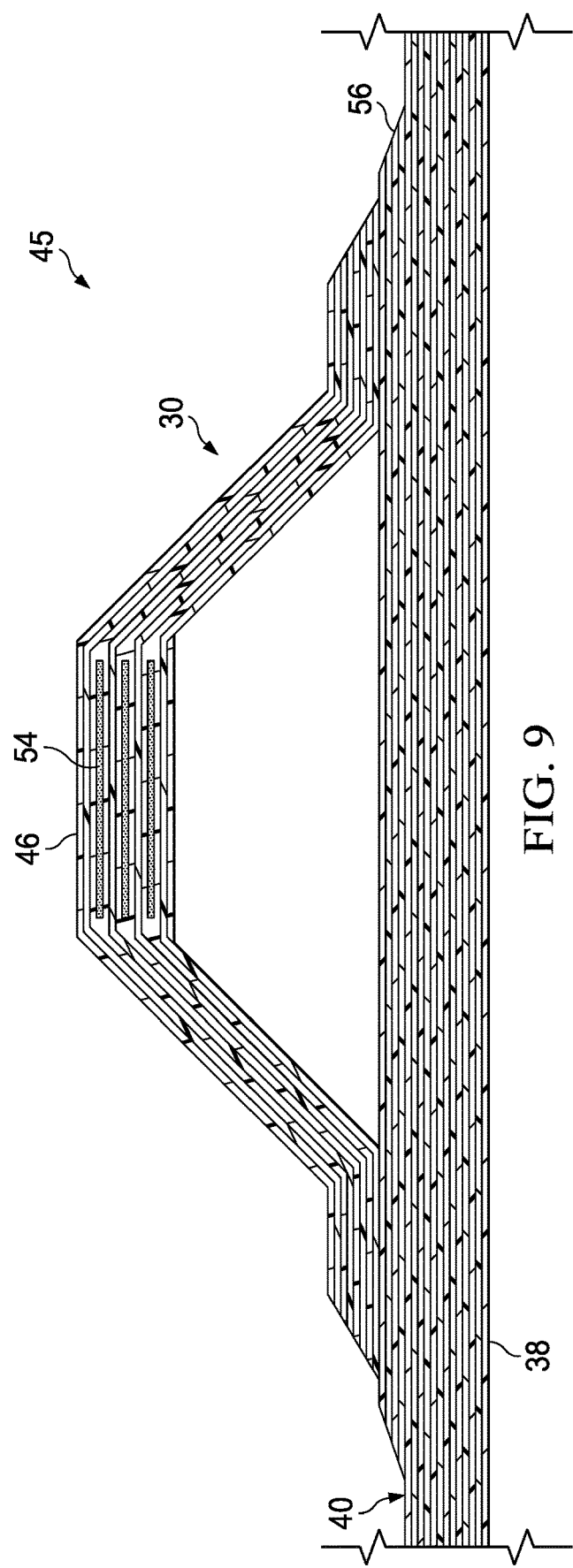
FIG. 9 is an illustration similar to FIG. 4 but showing another example of a skin stiffened with the hat stringers.
Figure 10:
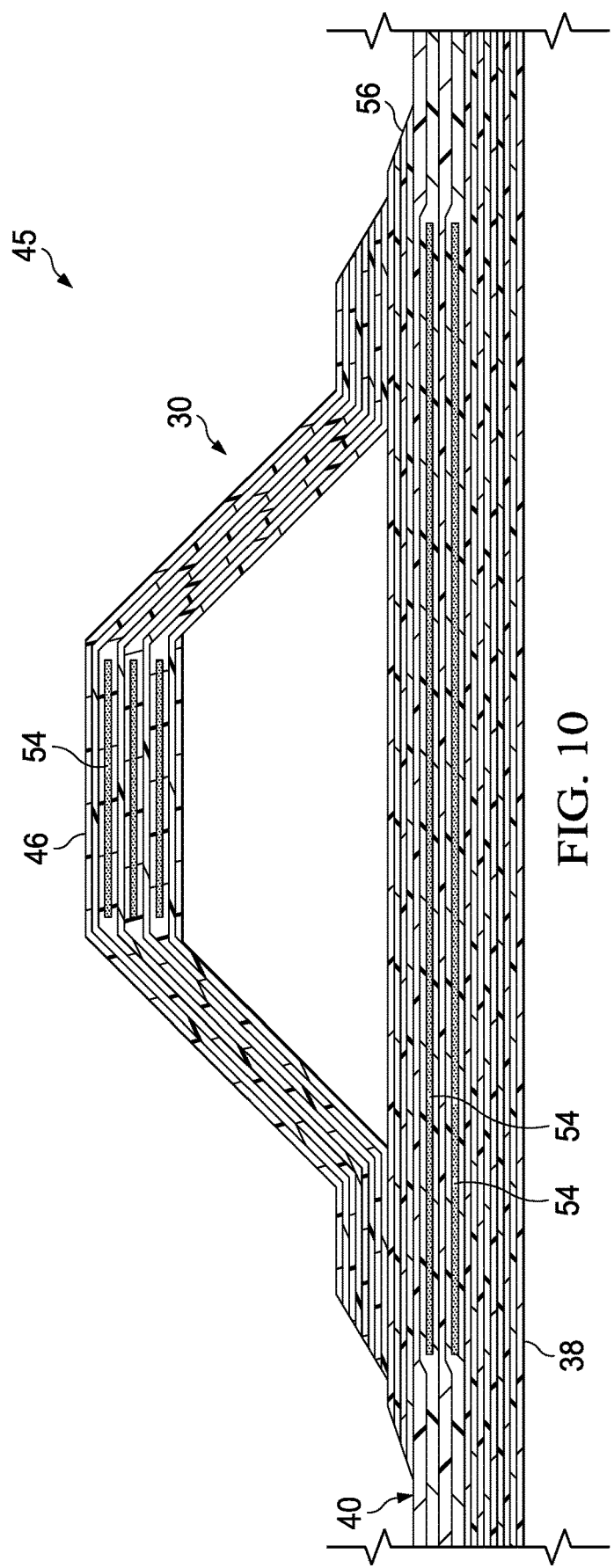
FIG. 10 is an illustration similar to FIG. 4, but showing a further example of a skin stiffened with the hat stringers.
Figure 11:
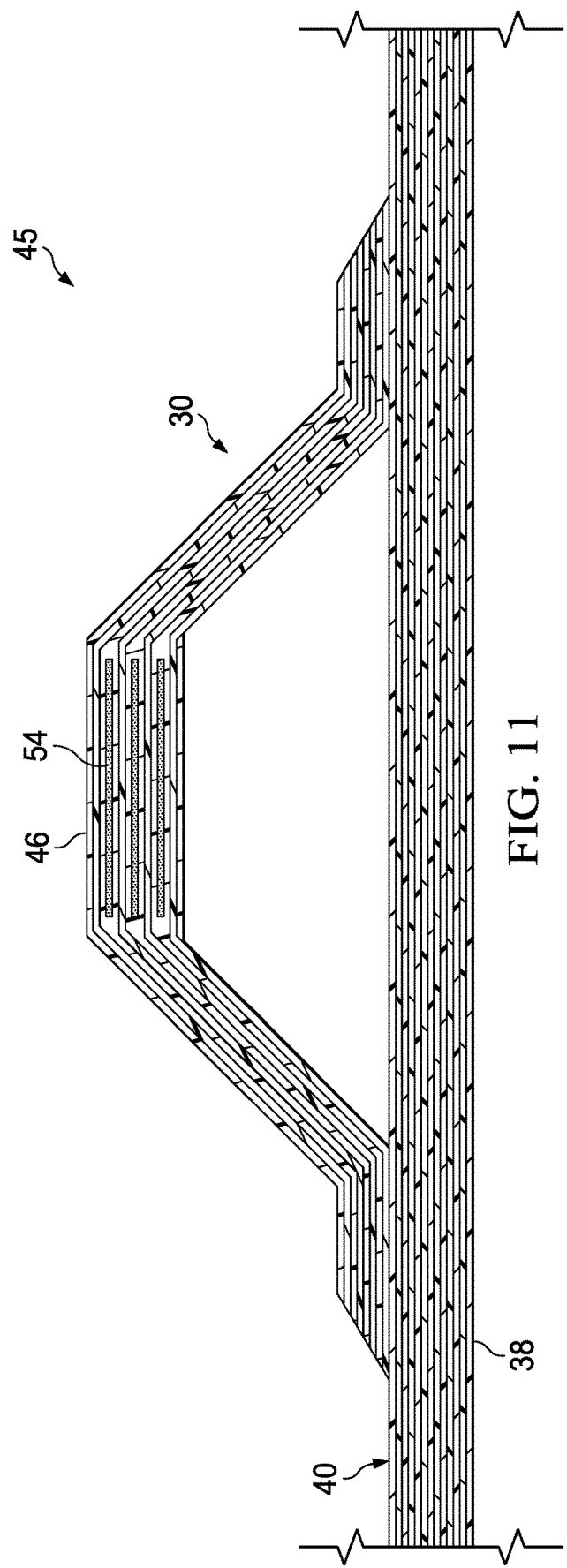
FIG. 11 is an illustration similar to FIG. 4, but showing still another example of a skin stiffened with the hat stringers.

In the examples discussed above, the hat stringers 30 are used to reinforce a skin 38 having a base charge 56 containing 0° composite tape plies 54. However, the disclosed hat stringers 30 may be used to reinforce other types of panels used in a variety of applications. For example, as shown in FIG. 9, the hat stringers 30 may be used to reinforce a composite laminate skin 38 provided with a base charge 56 formed of composite tape plies 54 that do not have interleafed 0° composite tape plies 54. Also, as shown in FIG. 10, hat stringers 30 may be used to reinforce a composite laminate skin 38 in which the base charge 56 is devoid of 0° composite tape plies 54, but the skin 38 contains one or more 0° composite tape plies 54. Further, as shown in FIG. 11, the disclosed hat stringers 30 may be used to reinforce a composite laminate skin that contains neither a base charge 56 nor 0° composite tape plies 54.

Figure 12:
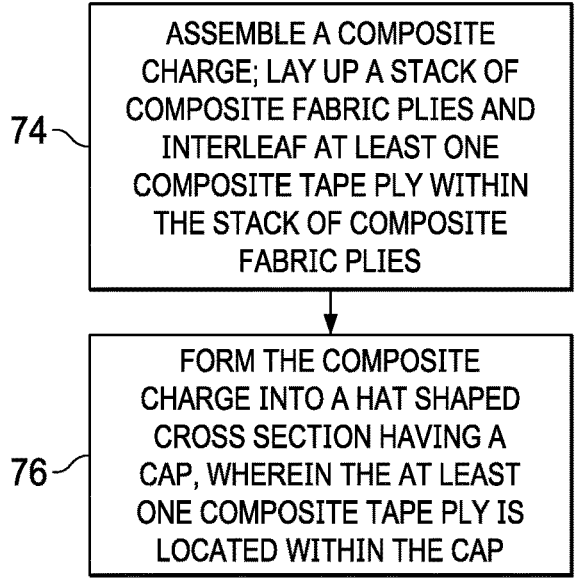
FIG. 12 is an illustration of a flow diagram of a method of making hat stringers.

FIG. 12 broadly illustrates the steps of a method of making a hat stringer 30 of the type described above. At 74, a composite charge is assembled, including laying up a stack of composite fabric plies 52, and interleafing at least one composite tape ply 54 within the stack. At 76, the composite charge is formed into a hat shaped cross section having at least one composite tape ply located within the cap. The forming process may be carried out using automated tooling apparatus, for example, in which a male tool punches the composite charge into a female tool having the cross-sectional shape of the hat stringer. In some applications, the tools may be displaced to impart one or more contours to the hat stringer 30 along its length.

Figure 13:
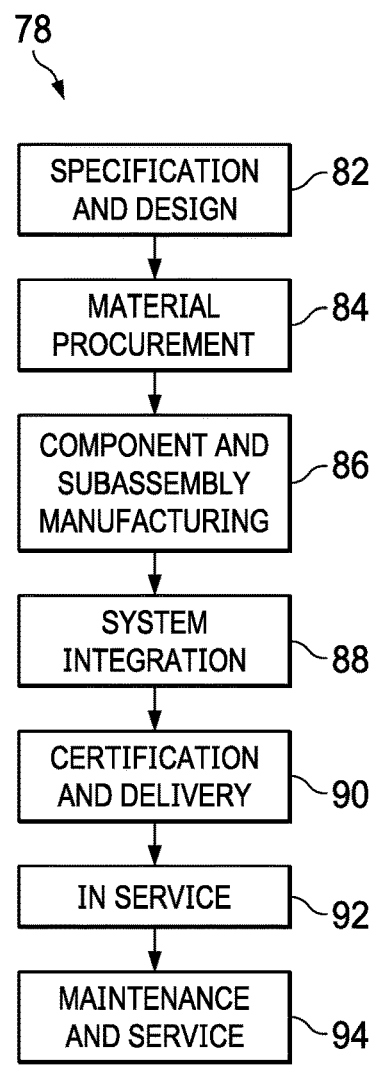
FIG. 13 is an illustration of a flow diagram of aircraft production and service methodology.
Figure 14:
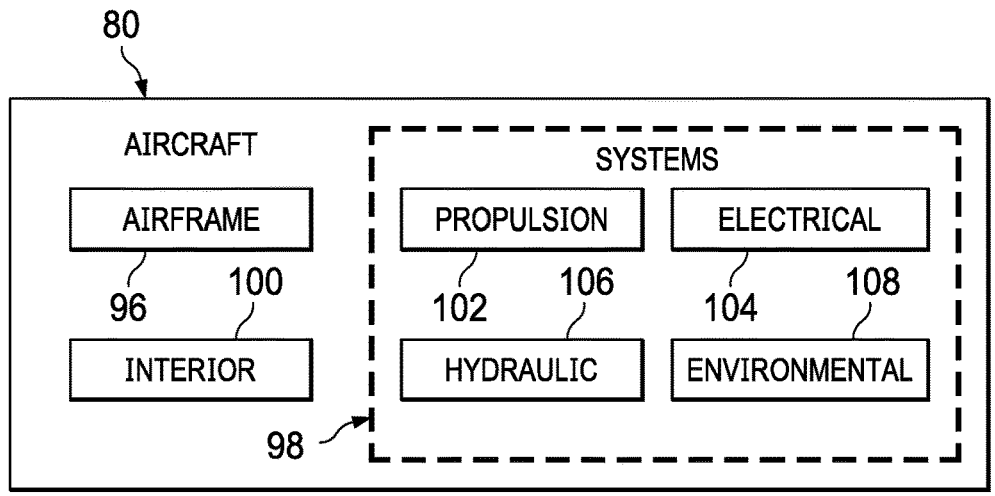
FIG. 14 is an illustration of a block diagram of an aircraft.

Examples in accordance with this disclosure may find use in a variety of potential applications, particularly in the transportation industry, including for example, aerospace, marine, automotive applications and other application where composite laminate hat stringers are used, such as in the airframe of an aircraft. Thus, referring now to FIGS. 13 and 14, examples of the disclosure may be used in the context of an aircraft manufacturing and service method 78 as shown in FIG. 13 and an aircraft 80 as shown in FIG. 14. Aircraft applications of the disclosed examples may include a variety of panels that require stringer reinforcement. During pre-production, exemplary method 78 may include specification and design 82 of the aircraft 80 and material procurement 84. During production, component and subassembly manufacturing 86 and system integration 88 of the aircraft 80 takes place. Thereafter, the aircraft 80 may go through certification and delivery 90 in order to be placed in service 92. While in service by a customer, the aircraft 80 is scheduled for routine maintenance and service 94, which may also include modification, reconfiguration, refurbishment, and so on.

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 80 produced by exemplary method 78 may include an airframe 96 with a plurality of systems 98 and an interior 100. Examples of high-level systems 98 include one or more of a propulsion system 102, an electrical system 104, a hydraulic system 106 and an environmental system 108. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 78. For example, components or subassemblies corresponding to production process 86 may be fabricated or manufactured in a manner similar to components or subassemblies produced while the aircraft 80 is in service. Also, one or more apparatus examples, method examples, or a combination thereof may be utilized during the production processes 86 and 88, for example, by substantially expediting assembly of or reducing the cost of an aircraft 80. Similarly, one or more of apparatus examples, method examples, or a combination thereof may be utilized while the aircraft 208 is in service, for example and without limitation, to maintenance and service 94.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A composite hat stringer joined to a base charge for stiffening a panel, comprising:
   a plurality of composite fabric plies arranged to form a cap, a pair of flanges and a pair of webs respectively connecting the cap with the pair of flanges; and
   at least one composite tape ply within the cap;
   wherein the base charge extends in a spanwise direction of the panel and includes a plurality of composite tape plies having unidirectional reinforcing fibers with differing fiber orientation angles, including interleafed composite tape plies having a 0° orientation extending in the spanwise direction of the panel.

2. The composite hat stringer of claim 1, wherein:
   each of the composite fabric plies includes unidirectional reinforcing fibers interwoven with differing fiber orientations, and
   the at least one composite tape ply includes unidirectional reinforcing fibers having a 0° fiber orientation aligned with a longitudinal axis of the composite hat stringer.

3. The composite hat stringer of claim 1, wherein the at least one composite tape ply is located above a midplane of the composite hat stringer.

4. The composite hat stringer of claim 1, further comprising:
   a second plurality of composite tape plies interleafed with the plurality of composite fabric plies in the cap.

5. The composite hat stringer of claim 4, further comprising:
   at least two composite tape plies of the second plurality of composite tape plies located within the cap and separated by at least one of the plurality of composite fabric plies.

6. The composite hat stringer of claim 1, wherein:
   The at least one composite tape ply includes opposite edges respectively spaced inwardly from outer edges of the cap.

7. The composite hat stringer of claim 1, wherein the composite hat stringer has a neutral axis, and the at least one composite tape ply is spaced above the neutral axis.

8. The composite hat stringer joined to a base charge for stiffening a panel of claim 1, wherein:
   the base charge includes from approximately 2 to approximately 6 0° composite tape plies,
   the composite hat stringer includes from approximately 6 to approximately 12 composite fabric plies, and
   the composite hat stringer includes a cap including from approximately 2 to approximately 4 0° orientation composite tape plies.

9. A stiffened composite panel assembly, comprising:
a composite panel formed of multiple plies of composite tape, the composite panel including a base charge extending in a spanwise direction of the composite panel; and
a composite hat stringer joined to the base charge and extending in the spanwise direction of the composite panel, the composite hat stringer being formed of laminated plies of composite fabric and including at least one composite tape ply;
wherein the base charge includes a plurality of composite tape plies having unidirectional reinforcing fibers with differing fiber orientation angles, including interleafed composite tape plies having a 0° orientation extending in the spanwise direction of the composite panel.

10. The stiffened composite panel assembly of claim 9, further comprising a second plurality of composite tape plies interleafed with the laminated plies of composite fabric.

11. The stiffened composite panel assembly of claim 9, wherein the at least one composite tape ply is located above a midplane of the composite hat stringer.

12. The stiffened composite panel assembly of claim 9, wherein:
the base charge includes from approximately 2 to approximately 6 0° composite tape plies,
the composite hat stringer includes from approximately 6 to approximately 12 laminated plies of composite fabric, and
the composite hat stringer includes a cap including from approximately 2 to approximately 4 0° composite tape plies.

13. The stiffened composite panel assembly of claim 9, wherein:
the base charge includes from approximately 4 to approximately 8 0° composite tape plies,
the composite hat stringer includes from approximately 12 to approximately 24 laminated plies of composite fabric, and
the composite hat stringer includes a cap including from approximately 4 to approximately 6 0° composite tape plies.

14. The stiffened composite panel assembly of claim 9, wherein:
the base charge includes greater than 8 0° composite tape plies,
the composite hat stringer includes greater than 24 laminated plies of composite fabric, and
the composite hat stringer includes a cap including greater than 6 0° composite tape plies.

15. The stiffened composite panel assembly of claim 9, wherein:
the composite hat stringer includes a cap, and
the at least one composite tape ply is located within the cap and includes unidirectional reinforcing fibers having a 0° fiber orientation extending in the spanwise direction of the composite panel.

16. The stiffened composite panel assembly of claim 15, wherein the at least one composite tape ply includes opposite edges respectively spaced inwardly from outer edges of the cap.

17. The stiffened composite panel assembly of claim 15, wherein the multiple plies of composite tape are separated from each other by at least one of the laminated plies of composite fabric.

18. The stiffened composite panel assembly of claim 9, wherein the composite panel includes a second plurality of composite tape plies located beneath the base charge and having unidirectional reinforcing fibers with differing fiber orientation angles, including interleafed composite tape plies having a 0° orientation extending in the spanwise direction of the composite panel.

19. The stiffened composite panel assembly of claim 9, wherein:
each of the composite fabric plies includes unidirectional reinforcing fibers interwoven with differing fiber orientations, and
the at least one composite tape ply includes unidirectional reinforcing fibers having a 0° fiber orientation aligned with a longitudinal axis of the composite hat stringer.

20. The stiffened composite panel assembly of claim 9, wherein the composite hat stringer has a neutral axis, and the at least one composite tape ply is spaced above the neutral axis.

* * * * *